(No Model.)
G. H. REYNOLDS, G. H. ROBINSON & F. GLASSER.
Pipe Coupling.
No. 238,437. Patented March 1, 1881.
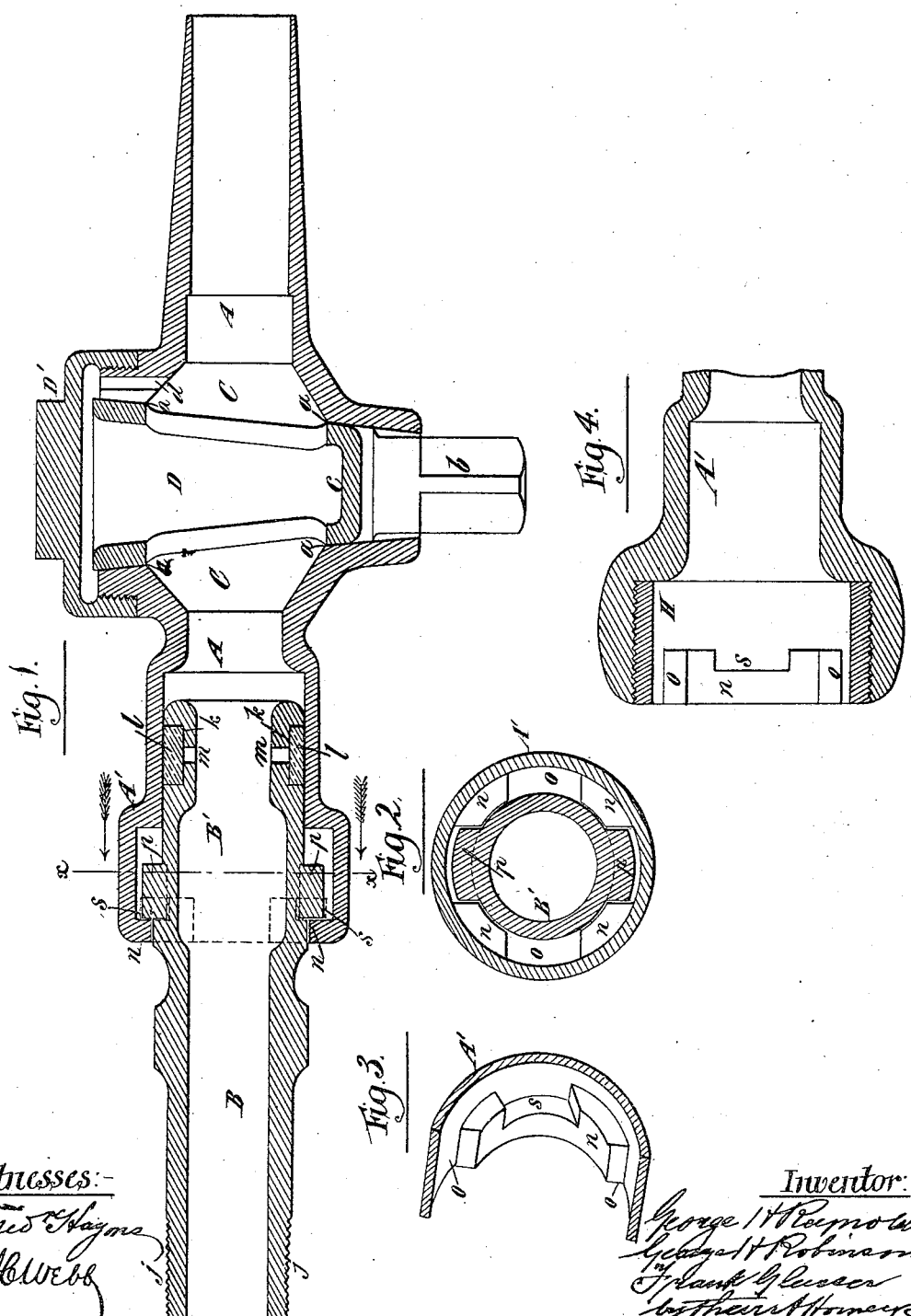

UNITED STATES PATENT OFFICE.

GEORGE H. REYNOLDS AND GEORGE H. ROBINSON, OF NEW YORK, AND FRANK GLASSER, OF MINEVILLE, N. Y.

PIPE-COUPLING.

SPECIFICATION forming part of Letters Patent No. 238,437, dated March 1, 1881.

Application filed May 31, 1880. (No model.)

*To all whom it may concern:*

Be it known that we, GEORGE H. REYNOLDS and GEORGE H. ROBINSON, both of the city of New York, in the county and State of New York, and FRANK GLASSER, of Mineville, in the county of Essex and State of New York, have invented certain new and useful Improvements in Couplings and Cocks, of which the following is a specification.

Our invention especially relates to the couplings and cocks for pipes or hose through which fluids employed as motive agents are to be conveyed, and is particularly intended for use in connection with the hose or pipes through which compressed air is conveyed to rock-drills from any source of supply.

One of our improvements consists in a novel construction of a cock and taper-plug, whereby the air or other motive agent acts at all times, whether the cock is open or closed, to force the taper-plug into its seat and thus prevent leakage.

Another of our improvements consists in the combination, with a coupling, of a cock the shell of which is formed in one and the same piece with one part or portion of the coupling, a taper-plug fitting in said shell, a closed chamber beyond the end of said plug, and an aperture from the shell to the interior of said chamber.

Another improvement consists in a coupling for pipes composed of two tubular parts, through which water may flow, adapted to fit one within the other, one of which is provided with an inwardly-projecting flange in which are notches, and having a catch or catches in rear of said flange, and the other of which is provided with lugs adapted to pass through said notches, and when one of said parts is turned and moved longitudinally outward, to engage with the catch or catches upon the first-said part and thereby preclude the accidental turning of the parts relatively to each other in either direction. The said catch or catches may consist of recesses upon the inner face or back of the said flange, which are adapted to receive the said lugs.

Other improvements consist in details of construction to be hereinafter explained.

In the accompanying drawings, Figure 1 represents a longitudinal section through a coupling and cock embodying our improvements. Fig. 2 represents a transverse section upon the dotted line $x\,x$, Fig. 1, looking in the direction indicated by the arrows. Fig. 3 represents a sectional perspective view of one part or portion of the coupling, and Fig. 4 represents a longitudinal section through a similar part or portion, slightly modified in form.

Similar letters of reference designate corresponding parts in all the figures.

A and B designate the two parts or portions of which our improved coupling is composed.

In order to enable the air or other motive agent circulating through the pipe and coupling to be cut off at any point at which it is desired to uncouple the hose or pipe, we combine with one part or portion of the coupling a cock which may be operated to stop the flow of air or other motive agent through the pipe. This is especially advantageous in the operation of rock-drills, for by its use the drill may be uncoupled from the supply hose or pipe without the necessity of going back to the source of supply to cut off the circulation through the hose or pipe. As here represented, the part A of the coupling is constructed so as to form the shell C of a cock; and D designates a taper-plug fitting a correspondingly-tapered seat, $a$, in the shell C. At the end of the shell C is a chamber, D′, here represented as formed by a removable cap, which closes the end of the shell C after the introduction of the plug D. It will be observed that the head $b$, by which the plug D is turned, is placed at the small end thereof, and that the large end is open, so that the pressure upon the surface $c$ tends to force the plug into its seat and prevent leakage. This same result is secured, when the cock is closed, by the hole or aperture $d$, through which the air or other motive agent may pass, so as to exert a pressure upon the large end of the plug. This construction is very advantageous, as it automatically takes up wear and prevents leakage, dispensing with the nut usually placed upon the small end of the plug, which must be often tightened to prevent leakage.

We will now proceed to describe the means shown for connecting the two parts A and B of the coupling. The part B, which is provided with a screw-thread, $j$, by which it may be secured to a rock-drill or other engine, is provided at its other end with a cylindrical portion, B', adapted to fit snugly within a socket, A', forming part of the part A. The said cylindrical portion is shown as provided with a groove or recess, $k$, for the reception of a packing, $l$, of rubber or other suitable material, and with holes or apertures $m$, which enable the air or other motive agent to exert an outward pressure upon the packing $l$. The cylindrical socket A' is provided with an inwardly-projecting lip or flange, $n$, in which are notches $o$, and the part B' is furnished with projections or lugs $p$, of a size to pass readily through said notches and to engage with the flange $n$ upon the turning of the parts A and B relatively to each other, as is common in other couplings. Within the cylindrical socket A', and in the rear of the flange $n$, are one or more catches, with which the lugs $p$ engage when the parts are turned in the act of coupling and moved longitudinally outward, and which prevent the accidental turning of the parts in either direction. As here represented, these catches consist of recesses $s$ in the back of the flange $n$, of a size to receive the lugs $p$; but they might be otherwise formed—as, for instance, by pairs of ears or lugs projecting from the flange and adapted to receive the lugs $p$ between them. In order to provide for readily running the flange $n$ in case the recesses $s$ should become worn so as to be unreliable, we may, if desired, employ a bushing, H, provided with such flange, and which may be screwed into the socket A' of the part A, as clearly shown in Fig. 4.

By the use of our combined coupling and cock an important saving of time is effected in coupling and uncoupling hose or pipes, and a very secure coupling is provided.

We also provide a cock which will not be liable to leakage and will always be kept tight by the pressure of air or other motive agent within the pipe. It is also obvious that as the shell of the cock is made in one and the same piece with one part of the coupling there is no danger of leakage, as would be the case were the cock made separately and secured to the parts of the coupling by bolts, or otherwise, thus forming joints, which would be greatly strained by the shock incident to the sudden stoppage of the circulation through the pipe.

What we claim as our invention, and desire to secure by Letters Patent, is—

1. The combination, in a cock, of a shell, a taper-plug fitting therein, a closed chamber beyond the end of the said plug, and an aperture from the shell to the interior of said chamber, substantially as and for the purpose specified.

2. The combination, with a coupling, of a cock the shell of which is formed in one and the same piece with one part or portion of the coupling, a taper plug fitting in said shell, a closed chamber beyond the end of said plug, and an aperture from the shell to the interior of said chamber, substantially as and for the purpose specified.

3. The combination, in a cock, of the shell C, the hollow plug D, fitting therein and having its large end open, and the head $b$ at the small end thereof, the removable cap D', and the hole or aperture $d$, substantially as and for the purpose specified.

4. A coupling for pipes composed of two tubular parts through which water may flow, adapted to fit one within the other, one of which is provided with an inwardly-projecting flange, in which are notches, and has a catch or catches in rear of said flange, and the other of which is provided with lugs adapted to pass through said notches, and when one of said parts is turned and moved longitudinally outward to engage with said catch or catches, so as to preclude either part from turning in either direction independently of the other part, substantially as specified.

5. The combination, with the cylindrical socket A', provided with the flange $n$, in which are notches $o$, and upon the back of which are recesses $s$, of the cylindrical portion B', adapted to fit within said socket, and provided with the lugs $p$, adapted, when one of said parts is turned and moved longitudinally outward, to engage with the recesses $s$, whereby the parts are precluded from turning independently of each other in either direction, substantially as specified.

6. The combination, with the cylindrical socket A', provided with the flange $n$, in which are notches $o$, and upon the inner face of which are recesses $s$, of the cylindrical portion B', adapted to enter said socket, provided with lugs $p$, and with a groove, $k$, in which is a packing, $l$, all substantially as specified.

7. The combination of the cylindrical socket A' and the removable bush H, provided with the flange $n$, in which are notches $o$, and in the back of which are recesses $s$, substantially as specified.

GEO. H. REYNOLDS.
GEORGE H. ROBINSON.
FRANK GLASSER.

Witnesses:
A. C. WEBB,
CHANDLER HALL.